US012551410B2

(12) United States Patent
Xie et al.

(10) Patent No.: US 12,551,410 B2
(45) Date of Patent: Feb. 17, 2026

(54) PILL DISPENSER

(71) Applicant: XIWING E-COMMERCE(ZHUHAI) CO., LTD, Zhuhai (CN)

(72) Inventors: Heng Xie, Zhuhai (CN); Jinpeng Guo, Zhuhai (CN)

(73) Assignee: XIWING E-COMMERCE(ZHUHAI) CO., LTD, Zhuhai (CN)

( * ) Notice: Subject to any disclaimer, the term of this patent is extended or adjusted under 35 U.S.C. 154(b) by 245 days.

(21) Appl. No.: 18/599,220

(22) Filed: Mar. 8, 2024

(65) Prior Publication Data

US 2024/0358595 A1 Oct. 31, 2024

(30) Foreign Application Priority Data

Apr. 26, 2023 (CN) ........................ 202310472812.5

(51) Int. Cl.
*B65D 83/04* (2006.01)
*A61J 7/00* (2006.01)

(52) U.S. Cl.
CPC ........ *A61J 7/0076* (2013.01); *B65D 83/0409* (2013.01); *B65D 2583/049* (2013.01)

(58) Field of Classification Search
CPC ... A61J 7/0076; A61J 7/0084; B65D 83/0409; B65D 83/0445; B65D 83/049; B65D 83/0454; B65D 2583/049
USPC ................................................ 221/151, 152
See application file for complete search history.

(56) References Cited

U.S. PATENT DOCUMENTS 4,288,006 A * 9/1981 Clover, Jr. ........... B65D 47/265 222/42
5,762,199 A * 6/1998 Aguilera ............ B65D 83/0454 206/533
7,090,072 B1 * 8/2006 Elliott .................... B44D 3/122 220/736
7,228,991 B2 * 6/2007 Barraclough ............ A23G 9/22 222/144.5
7,240,795 B2 * 7/2007 Lee ........................ B65D 25/04 206/534
8,714,353 B2 * 5/2014 Hohlbein ............... B65D 25/04 206/362
9,469,451 B2 * 10/2016 Dunn ..................... A47G 11/00
10,329,059 B1 * 6/2019 Heilman ............ B65D 21/0204
10,869,578 B2 * 12/2020 Fang ....................... A47J 47/01

* cited by examiner

*Primary Examiner* — Leslie A Nicholson, III

(57) ABSTRACT

A pill dispenser includes a dispenser body, a pill dispensing cover, and a pill outlet cover. The dispenser body is hollow. A fixed cylinder is disposed at a center of the dispenser body. Partition plates are connected between the fixed cylinder and the dispenser body to define pill cavities. The partition plates are disposed in a circumferential array. At least one end of each of the partition plates extends out of the dispenser body. Clamping grooves are defined in the pill dispensing cover. A periphery of each of the partition plates is clamped in a corresponding one of the clamping grooves, so the pill dispensing cover is fixed to the dispenser body. The pill dispensing cover includes pill dispensing openings one-to-one corresponding to the pill cavities. When the pill dispensing cover is fixed to the dispenser body, each of the partition plates abuts against the pill dispensing cover.

14 Claims, 7 Drawing Sheets

PILL DISPENSER

TECHNICAL FIELD

The present disclosure relates to a technical field of pill bottles, and in particular to a pill dispenser that prevent pills from tainting by other odor.

BACKGROUND

Pills are generally stored in pill bottles to protect the pills from dust and moisture.

The CN invention application No. CN202121680060.4 discloses a household pill dispenser that is easy to dispense pills. The household pill dispenser comprises a dispenser body, a bottom cover, a ventilation plate, a rotating cover, and a sealing cap.

The dispenser body defines an accommodating cavity. Partition plates are fixedly mounted in the accommodating cavity to define pill cavities. An upper end surface of the bottom cover defines accommodating groove, and the bottom cover is fixedly mounted on a bottom portion of the dispenser body and seals one end of the accommodating cavity.

The ventilation plate comprises ventilation holes. The ventilation plate is fixedly mounted on an upper end of the accommodating groove or a bottom portion of the accommodating cavity, and the ventilation plate separates the accommodating groove and the accommodating cavity. A mounting groove is defined on an upper end surface of the rotating cover. The mounting groove defines a pill outlet. The rotating cover is matched with the accommodating cavity. The rotating cover is rotatably mounted on an upper end of the dispenser body. The sealing cover is fixedly mounted on the mounting groove. On one hand, different types of pills and capsules are allowed to be separately accommodated in the household pill dispenser, on the other hand, it is also convenient to distinguish, identify, and take out the pills.

In order to facilitate dispensation of different types of pills and capsules, a rotating cover of a pill dispenser in the prior art is rotatably connected to an upper end of a dispenser body, so that when the rotating cover is rotated, a pill outlet thereof is allowed to be rotated to a corresponding accommodating cavity, and then the pills are poured out. However, there is a problem that a pill may be stuck between an upper end of a corresponding partition plate and a bottom surface of the rotating cover. When the rotating cover is rotated, the pill may be ground and damaged, or the pill may be driven to other accommodating cavities and mixed with other pills. Moreover, debris of the pill may be attached to the rotating cover, causing the pills in other accommodating cavities being tainted by odor of the pill and affecting the effectiveness of the pills.

SUMMARY

In order to solve defects in the prior art, the present disclosure provides a pill dispenser that prevent pills from tainting by other odor. The pill dispenser comprises a dispenser body, a pill dispensing cover, and a pill outlet cover.

The dispenser body is hollow. A fixed cylinder is disposed at a center of the dispenser body. Partition plates are connected between an outer wall of the fixed cylinder and an inner wall of the dispenser body to define pill cavities. The partition plates are disposed in a circumferential array along the center of the dispenser body. At least one end of each of the partition plates extends out of the dispenser body. Each of the pill cavities is defined between each two adjacent partition plates.

Clamping grooves are defined in an outer edge of a bottom portion of the pill dispensing cover. A periphery of each of the partition plates is clamped in a corresponding one of the clamping grooves, so the pill dispensing cover is fixed to the dispenser body. Pill dispensing openings are defined on the pill dispensing cover. The pill dispensing openings are one-to-one corresponding to the pill cavities. When the pill dispensing cover is fixed to the dispenser body, an end surface of each of the partition plates abuts against a bottom surface of the pill dispensing cover.

The pill outlet cover is rotatably connected to the pill dispensing cover. The pill outlet cover defines a pill outlet. The pill outlet cover rotates to enable the pill outlet to communicate with any one of the pill dispensing openings.

In one optional embodiment, a positioning column is protruded from a center of the bottom portion of the pill dispensing cover, and the positioning column is inserted into the fixed cylinder.

In one optional embodiment, an elastic positioning rib is disposed on an outer side wall of the pill dispensing cover. A first positioning protrusion is disposed on one end of the elastic positioning rib. The elastic positioning rib is forced to enable the first positioning protrusion to deform in a radial direction of the pill dispensing cover.

In one optional embodiment, positioning grooves are defined on an inner side wall of the pill outlet cover. The positioning grooves are disposed in a circumferential array. The first positioning protrusion is snapped in any one of the positioning grooves to enable the pill outlet to communicate with a corresponding pill dispensing opening.

In one optional embodiment, an elastic positioning rib is disposed on an inner side wall of the pill outlet cover. A first positioning protrusion is disposed on one end of the elastic positioning rib. The elastic positioning rib is forced to enable the first positioning protrusion to deform in a radial direction of the pill outlet cover.

In one optional embodiment, positioning grooves are defined on an outer side wall of the pill dispensing cover. The positioning grooves are disposed in a circumferential array. The first positioning protrusion is snapped in any one of the positioning grooves to enable the pill outlet to communicate with a corresponding pill dispensing opening.

In one optional embodiment, plugging columns are protruded from a center of a bottom surface of the pill outlet cover. The plugging columns are inserted into the positioning column and fastened to the positioning column.

In one optional embodiment, the pill dispenser further comprises a pushing cover movably disposed on the pill outlet cover. The pushing cover is pushed to expose or close the pill outlet.

In one optional embodiment, the pill outlet cover comprises a fixed groove. The pill outlet is defined on a bottom wall of the fixed groove. The pill outlet is located on one end of the fixed groove. Sliding grooves are defined on the inner side of the fixed groove. The sliding grooves are disposed opposite to each other. Blocks are protruded from an outer side of the pushing cover. The blocks are one-to-one matched with the sliding grooves. The blocks are slidable along the sliding grooves to expose or close the pill outlet.

In one optional embodiment, a sliding portion and at least one positioning portion are defined on the fixed groove. A second positioning protrusion is disposed on a bottom portion of the pushing cover. The second positioning protrusion is disposed on one end of the pushing cover away from the pill outlet. The sliding portion and the at least one positioning portion are disposed opposite to the pill outlet. A center of the pill outlet, a center of the sliding portion, a center of the at least one positioning portion, and a center of the pill outlet cover are on a same straight line. When the pushing cover is pushed, the second positioning protrusion is slid in the sliding portion or is slid to be clamped in the at least one positioning portion.

In one optional embodiment, only one positioning portion is provided. The one positioning portion is located on one side of the sliding portion close to the pill outlet. When the pushing cover is pushed to enable the second positioning protrusion being clamped in the one positioning portion, the pushing cover completely covers the pill outlet to close the pill outlet. When the pushing cover is pushed to enable the second positioning protrusion to slide in the sliding portion, the pill outlet is partially exposed or completely exposed.

In one optional embodiment, two positioning portions are provided. The positioning portions comprise a first positioning portion and a second positioning portion. The first positioning portion and the second positioning portion are respectively located on two sides of the sliding portion. The first positioning portion is disposed close to the pill outlet. The second positioning portion is disposed away from the pill outlet. When the pushing cover is pushed to enable the second positioning protrusion being clamped in the one positioning portion, the pushing cover completely covers the pill outlet to close the pill outlet. When the pushing cover is pushed to enable the second positioning protrusion to slide in the sliding portion, the pill outlet is partially exposed. When the pushing cover is pushed to enable the second positioning protrusion being clamped in the second positioning portion, the pill outlet is completely exposed.

In one optional embodiment, sliding plates are respectively protruded from inner sides the sliding grooves. The sliding plates are disposed opposite to each other. Siding bars are disposed on a bottom portion of the pushing cover. The sliding bars are parallel to each other and spaced apart from each other. The sliding bars are respectively slidable on the sliding plates.

In one optional embodiment, the pill dispenser further comprises an upper cover and a bottom cover. The bottom cover covers on a lower end of the dispenser body. The upper cover covers on the pill outlet cover and is rotatably connected to an upper end of the dispenser body.

The pill dispensing cover is fixed to the upper end of the dispenser body are fixed when the partition plates are respectively clamped in the clamping grooves. The end surface of each of the partition plates is attached to the bottom surface of the pill dispensing cover, so that a pill would not be stuck between a corresponding partition plate and the pill dispensing cover. When a specific type of pills is selected and is poured out from the pill outlet, the pill dispensing cover is unable to be rotated, and it is only needed to rotate the pill outlet cover to make the pill outlet being corresponding to a corresponding pill dispensing opening and a corresponding pill cavity, then the pushing cover is pushed to expose the pill outlet, and the specific type of pills is poured out from the pill outlet by turning over the dispenser body. The pills are not damaged by grinding when the pill outlet cover is rotated, nor do the pills be carried into other pill cavities, so the specific type of pills in one pill cavity is not tainted by other odour.

The second positioning protrusion disposed on the pushing cover is matched with the two positioning portions for positioning, so that the pushing cover and the pill outlet cover are relatively fixed. When the pill outlet is completely exposed, the pill dispenser is turned over, and the second positioning protrusion is clamped in the second positioning portion, so the pushing cover do not slide down nor close the pill outlet, making a process of dispensing the specific type of pills smooth. When the pushing cover is pushed to enable the second positioning protrusion being clamped in the first positioning portion, the pushing cover close the pill outlet to prevent the pills from falling out and protect the pills against dust and moisture.

When the second positioning protrusion separates from any one of the two positioning portions and enters the sliding portion, the pushing cover slides to changes an exposed area of the pill outlet to control an amount of the pills poured out. If the amount of pills poured out is small, the exposed area of the pill outlet is reduced so that the pills are not poured out too much to increase a work of refilling. On the contrary, the exposed area is increased to pour more pills, so as to realize an adjustment of the amount of pills poured out.

The present disclosure will be further described in detail below in conjunction with the accompanying drawings and specific embodiments.

DETAILED DESCRIPTION

Figure 1:
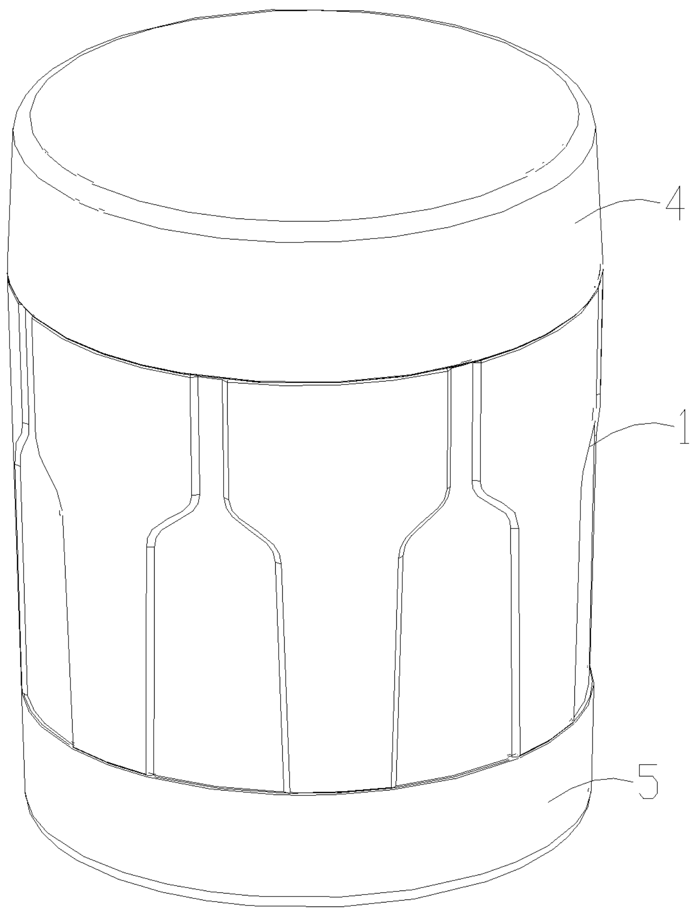
FIG. 1 is a structural schematic diagram of a pill dispenser of the present disclosure.

Technical solutions in the embodiments of the present disclosure will be clearly and completely described below in conjunction with the accompanying drawings in the embodiments of the present disclosure. Obviously, the described embodiments are only a part of the embodiments of the present disclosure, rather than all of the embodiments.

Examples of the embodiments are shown in accompanying drawings, in which same or similar reference numerals indicate the same or similar elements or elements with the same or similar functions. The embodiments described below with reference to the drawings are exemplary, and are intended to explain the present disclosure, but should not be regarded as a limitation to the present disclosure.

It should be understood that in the description of the present disclosure terms such as "central", "lateral", "lengthways", "length", "width", "thickness", "upper", "lower", "left", "right", "vertical", "horizontal", "top", "bottom", "inner", "outer", "clockwise", "counterclockwise", "axis", "radial", "circumferential", etc., indicate direction or position relationships shown based on the drawings, and are only intended to facilitate the description of the present disclosure and the simplification of the description rather than to indicate or imply that the indicated device or element must have a specific direction or constructed and operated in a specific direction, and therefore, shall not be understood as a limitation to the present disclosure.

It should be noted in the description of the present disclosure that, unless otherwise regulated and defined, terms such as "installation", "bonded", "connectionl", and "fix" shall be understood in broad sense, and for example, may refer to fixed connection or detachable connection or integral connection; may refer to mechanical connection or electrical connection; and may refer to direct connection or indirect connection through an intermediate medium or inner communication of two elements. For those of ordinary skill in the art, the meanings of the above terms in the present disclosure may be understood according to concrete conditions.

Figure 2:
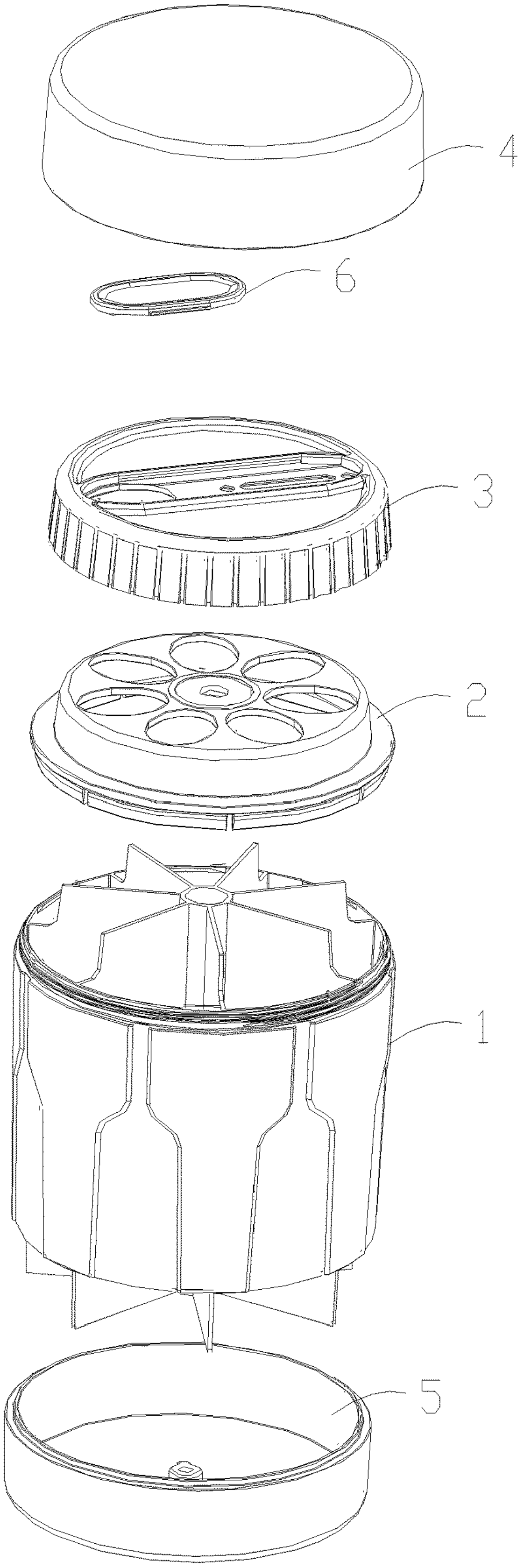
FIG. 2 is an exploded structural schematic diagram of the pill dispenser of the present disclosure.
Figure 3:
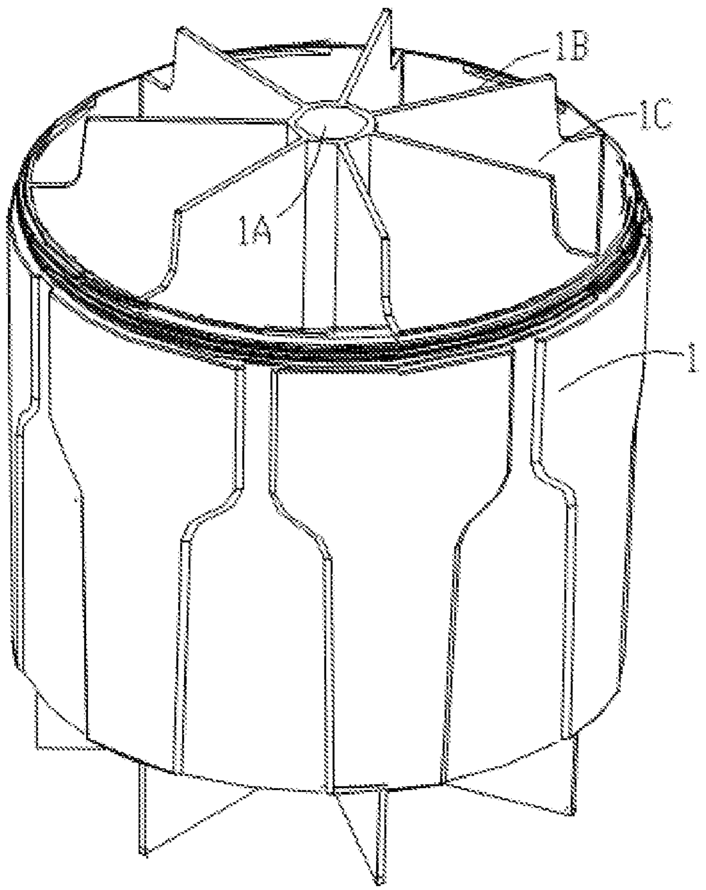
FIG. 3 is a structural schematic diagram of a dispenser body of the present disclosure.
Figure 4:
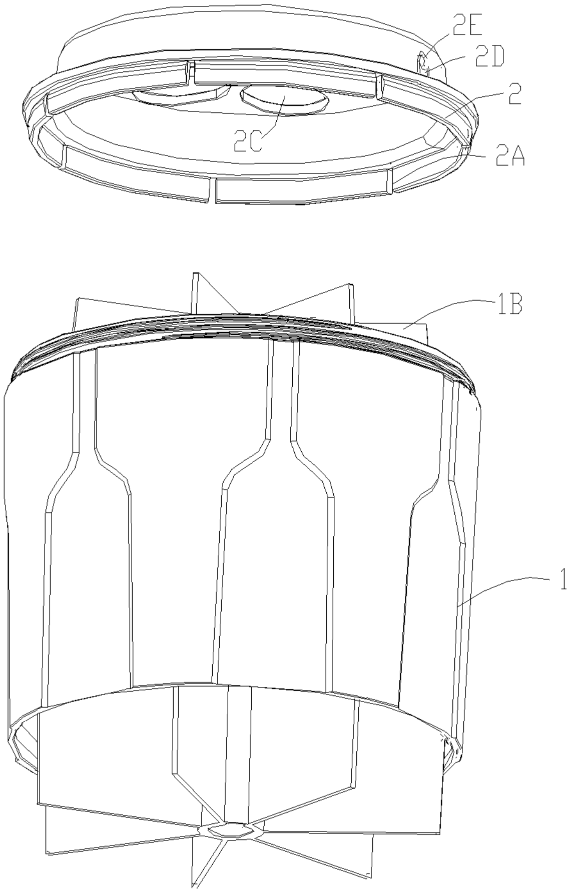
FIG. 4 is a structural schematic diagram of the dispenser body and a pill dispensing cover of the present disclosure.
Figure 5:
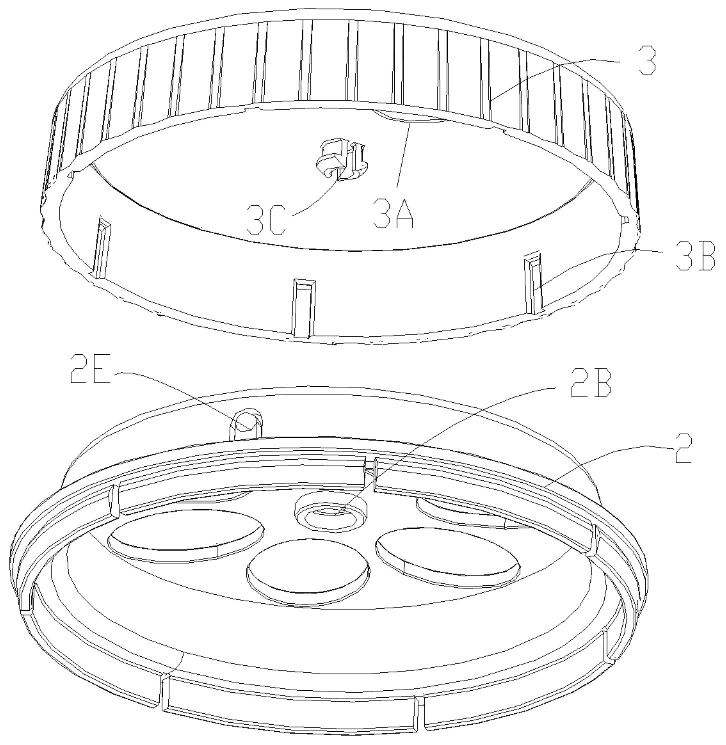
FIG. 5 is a structural schematic diagram of the pill dispensing cover and a pill outlet cover of the present disclosure.
Figure 6:
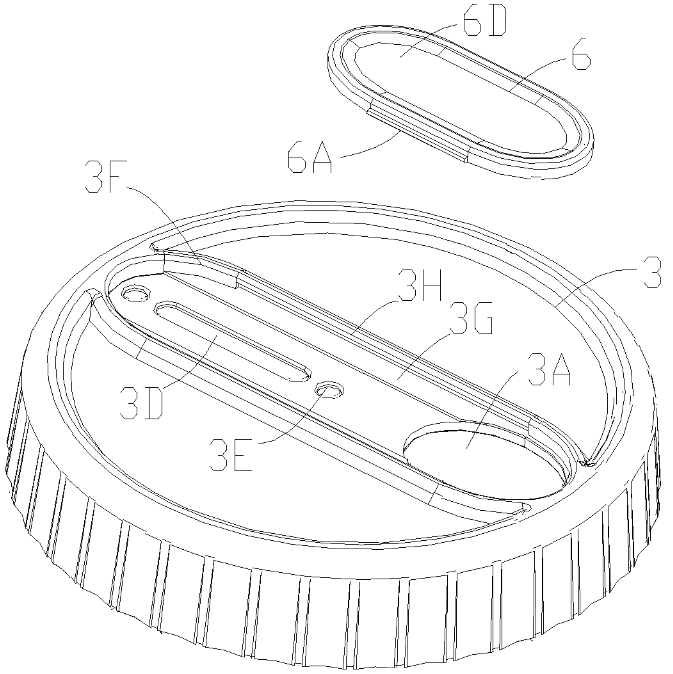
FIG. 6 is a structural schematic diagram of the pill outlet cover and a pushing cover of the present disclosure.
Figure 7:
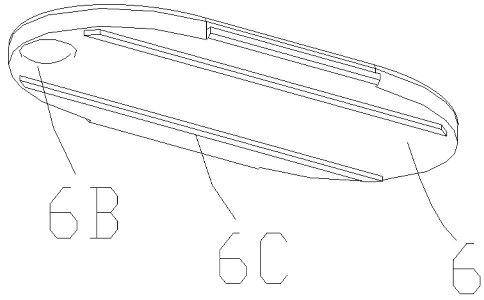
FIG. 7 is a structural schematic diagram of the pushing cover of the present disclosure.
Figure 8:
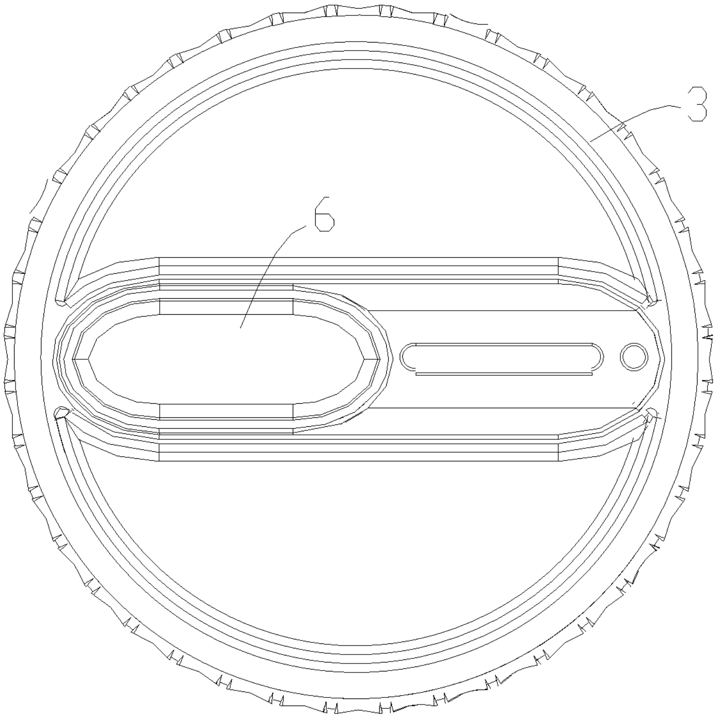
FIG. 8 is a structural schematic diagram of the pill outlet cover of the present disclosure where a pill outlet is closed by the pushing cover.
Figure 9:
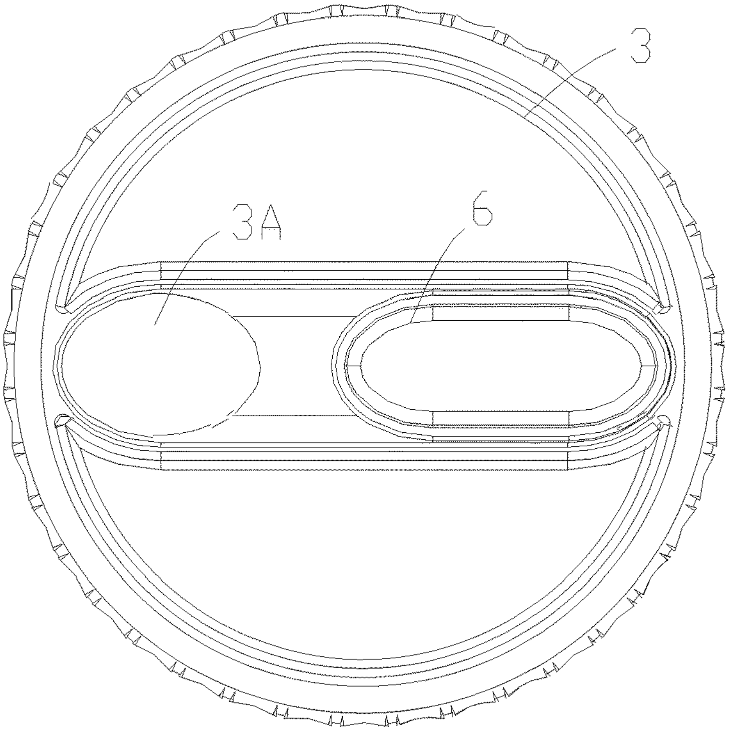
FIG. 9 is a structural schematic diagram of the pill outlet cover of the present disclosure where the pill outlet is completely exposed.
Figure 10:
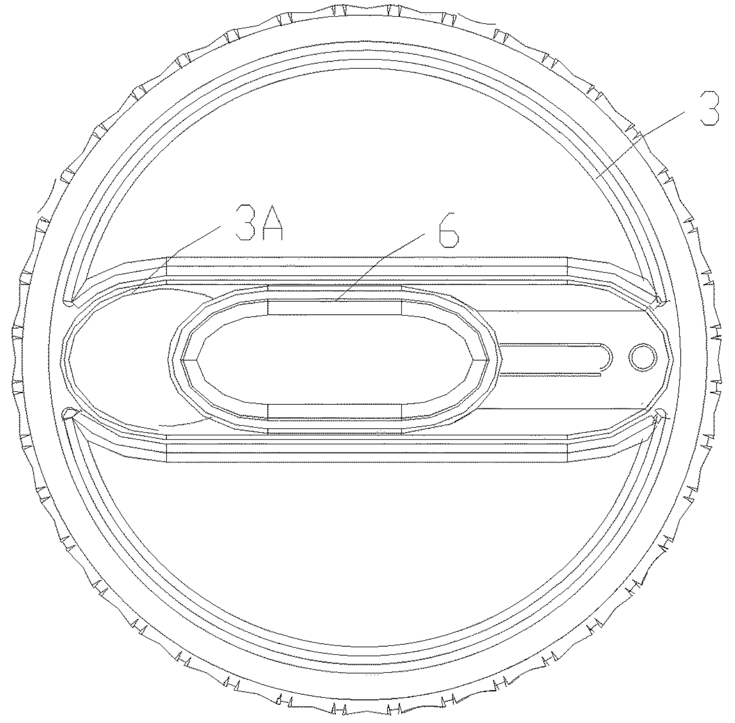
FIG. 10 is a structural schematic diagram of the pill outlet cover of the present disclosure where the pill outlet is partially exposed.

In the present disclosure, FIG. 1 is a structural schematic diagram of a pill dispenser of the present disclosure. FIG. 2 is an exploded structural schematic diagram of the pill dispenser of the present disclosure. FIG. 3 is a structural schematic diagram of a dispenser body of the present disclosure. FIG. 4 is a structural schematic diagram of the dispenser body and a pill dispensing cover of the present disclosure. FIG. 5 is a structural schematic diagram of the pill dispensing cover and a pill outlet cover of the present disclosure. FIG. 6 is a structural schematic diagram of the pill outlet cover and a pushing cover of the present disclosure. FIG. 7 is a structural schematic diagram of the pushing cover of the present disclosure. FIG. 8 is a structural schematic diagram of the pill outlet cover of the present disclosure where a pill outlet is closed by the pushing cover. FIG. 9 is a structural schematic diagram of the pill outlet cover of the present disclosure where the pill outlet is completely exposed. FIG. 10 is a structural schematic diagram of the pill outlet cover of the present disclosure where the pill outlet is partially exposed.

As shown in FIGS. 1 and 2, the present disclosure provides the pill dispenser that prevent pills from tainting by other odor. The pill dispenser comprises a dispenser body 1, a pill dispensing cover, a pill outlet cover, a top cover 4 and a bottom cover 5. The pill dispensing cover 2 is disposed on an upper end of the dispenser body 1. The pill outlet cover 3 is disposed on the pill dispensing cover 2. The bottom cover 5 covers on a lower end of the dispenser body 1. The upper cover 4 covers on the pill outlet cover 3 and is rotatably connected to the upper end of the dispenser body 1.

In one optional embodiment, as shown in FIG. 3, the dispenser body 1 is hollow. A fixed cylinder 1A is disposed at a center of the dispenser body 1. The fixed cylinder 1A is hollow. Partition plates 1B are connected between an outer wall of the fixed cylinder 1A and an inner wall of the dispenser body 1 to define pill cavities 1C. The partition plates 1B are disposed in a circumferential array along the center of the dispenser body 1. At least one end of each of the partition plates 1B extends out of the dispenser body. Specifically, at least an upper end of each of the partition plates 1B extends out of the dispenser body 1. The upper end of each of the partition plates 1B in the embodiment refers to one end of each of the partition plates 1B connected to the pill dispensing cover 2. Each of the pill cavities 1C is defined between each two adjacent partition plates 1B. As shown in FIG. 3, it is understood that two ends of each of the partition plates extend out of the dispenser body 1.

It is understood that each of the pill cavities 1C is configured to store one specific type of pills. Therefore, the pill dispenser of the present disclosure realizes a function of storing different types of pills and the different types of pills are stored separately in the pill cavities 1C. While a conventional pill bottle is only able to store a single type of pills. Therefore, by using the pill dispenser of the present disclosure, less pill bottles are used, which saves costs.

Further, a rotating cover of a pill dispenser in the prior art is rotatably connected to a dispenser body thereof, such that a pill may be stuck between a gap between a corresponding partition plate thereof and the rotating cover. When the rotating cover is rotated, the pill may be ground and damaged, or the pill may be driven to other accommodating cavities thereof and mixed with other pill, causing the pills in other accommodating cavities being tainted by odor of the pill, affecting recognition of the pills even affecting an effectiveness of the pills.

Therefore, as shown in FIG. 4., the pill dispensing cover 2 and the dispenser body 1 in the embodiment are fixedly connected. Specifically, camping grooves 2A are defined in an outer edge of a bottom portion of the pill dispensing cover 2. A periphery of each of the partition plates 1B is clamped in a corresponding one of the clamping grooves 2A, so the pill dispensing cover 2 is fixed to the dispenser body 1. In addition, a positioning column 2B is protruded from a center of the bottom portion of the pill dispensing cover 2, and the positioning column 3B is inserted into an upper end of the fixed cylinder 1A. When mounting the pill dispensing cover 2 to the dispenser body 1, the clamping grooves 2A are respectively aligned with the partition plates 1B and respectively clamp the partition plates 1B to realize fixation between the pill dispensing cover 2 and the dispenser body 1. Therefore, the mounting of the pill dispensing cover 2 and the dispenser body 1 is very convenient.

Furthermore, pill dispensing openings 2C are defined on the pill dispensing cover 2. The pill dispensing openings 2C are one-to-one corresponding to the pill cavities 1C. When the pill dispensing cover 2 is fixed to the dispenser body 1, an end surface of each of the partition plates 1B abuts against a bottom surface of the pill dispensing cover 2. It is easy to understand that the pill would not be stuck, since there is no gap between the partition plates 1B and the pill dispensing cover 2. The pill dispensing cover 2 and the dispenser body 1 are fixed relative to each other, so the pill would not be damaged by the pill dispensing cover 2.

In addition, as shown in FIG. 5, the pill outlet cover 3 is rotatably connected to the pill dispensing cover 2. The pill outlet cover 3 defines a pill outlet 3A. The pill outlet cover 3 rotates to enable the pill outlet 3A to communicate with any one of the pill dispensing openings 2C. When the pill outlet cover 3 rotates, the specific type of pills in one of the pill cavities corresponding to the pill outlet 3A is poured out from a corresponding pill dispensing opening 2C to the pill outlet 3A, and the specific type of pills would not fall into other pill cavities 1C. Therefore, the pill dispenser of the present disclosure also plays a role in preventing the pills from tainting by other odour, and well ensures quality of the pills stored therein.

Specifically, as shown in FIG. 5, an elastic positioning rib 2D is disposed on an outer side wall of the pill dispensing cover 2. A first positioning protrusion 2E is disposed on one end of the elastic positioning rib 2D. The elastic positioning rib 2D is forced to enable the first positioning protrusion 2E to deform in a radial direction of the pill dispensing cover 2.

The first positioning protrusion 2E is spherical and deforms relatively from an outer edge of the first positioning protrusion 2E toward a center thereof. The first positioning protrusion 2E is stresses to elastically deform inwards by an external force. When the external force disappears, the first positioning protrusion 2E resets outwards.

Accordingly, positioning grooves 3B are defined on an inner side wall of the pill outlet cover 3. The positioning grooves 3B are disposed in a circumferential array. The first positioning protrusion 2E is snapped in any one of the positioning grooves 3B to enable the pill outlet 3A to communicate with a corresponding pill dispensing opening 3A. The first positioning protrusion 2E is aligned with one of the positioning grooves 3B, and the pill outlet cover 3 is covered on the pill dispensing cover 2 along an axial direction thereof. The pill outlet cover 3 is rotated to deform the first positioning protrusion 2E away from the one of the positioning grooves 3B until the first positioning protrusion 2E is snapped into a next positioning groove 3B, so that a position of the pill outlet cover 3 relative to the pill dispensing cover 2 is fixed again.

The pill outlet cover 3 is rotated, so that the pill outlet 3A t is allowed to be communicated with any one of the pill dispensing openings to pour out different types of pills.

Furthermore, plugging columns 3C are protruded from a center of a bottom surface of the pill outlet cover 3. The plugging columns 3C are inserted into the positioning column 2B and fastened to the positioning column 2B. Specifically, the plugging columns 3C are inserted into the positioning column 2B and abut against an inner wall of the positioning column 2B through interference fit. Alternatively, the plugging columns 3C are inserted into and pass through the positioning column 2B, and the plugging columns 3C are snapped on an outer edge of the positioning column 2B. Therefore, the pill dispensing cover 2 is fixed on the dispenser body 1, and the pill outlet cover 3 is fixed on the pill dispensing cover 2.

In one optional embodiment, the pill dispenser further comprises a pushing cover 6 movably disposed on the pill outlet cover 3. The pushing cover 6 is pushed to expose or close the pill outlet 3A.

In one optional embodiment, the pill outlet cover 3 comprises a fixed groove 3F. The pill outlet 3A is defined on a bottom wall of the fixed groove 3F. The pill outlet 3A is located on one end of the fixed groove 3F. Sliding grooves 3H are defined on the inner side of the fixed groove 3F. The sliding grooves 3H are disposed opposite to each other. Blocks 6A are protruded from an outer side of the pushing cover 6. The blocks 6A are one-to-one matched with the sliding grooves 3H. The blocks 6A are slidable along the sliding grooves 3H to expose or close the pill outlet 3A.

A shape of the pill outlet 3A is circular or oval, which is not limited thereto. In the embodiment, the shape of the pill outlet 3A is oval as one of the optional embodiments.

In one optional embodiment, as shown in FIGS. 6 and 7, a sliding portion 3D and at least one positioning portion 3E are defined on the fixed groove 3F. A second positioning protrusion 6B is disposed on a bottom portion of the pushing cover 6 (a structure of the second positioning protrusion 6B is same as a structure of the first positioning protrusion 2E). The second positioning protrusion 6B is disposed on one end of the pushing cover 6 away from the pill outlet 3A. The sliding portion 3D and the at least one positioning portion 3E are disposed opposite to the pill outlet 3A. A center of the pill outlet 3A, a center of the sliding portion 3D; a center of the at least one positioning portion 3E, and a center of the pill outlet cover 3 are on a same straight line. When the pushing cover 6 is pushed, the second positioning protrusion 6B is slid in the sliding portion 3D or is slid to be clamped in the at least one positioning portion 3E. In the embodiment, an inner diameter of the at least one positioning portion 3E is same as an inner width of the sliding portion 3D.

In one optional embodiment, only one positioning portion 3E is provided. The one positioning portion 3E is located on one side of the sliding portion 3D close to the pill outlet 3A. When the pushing cover 6 is pushed to enable the second positioning protrusion 6B being clamped in the one positioning portion 3E, the pushing cover 6 completely covers the pill outlet 3A to close the pill outlet 3A. When the pushing cover 6 is pushed to enable the second positioning protrusion 6B to slide in the sliding portion 3D, the pill outlet 3A is partially exposed or completely exposed. Specifically, when the second positioning protrusion 6B is slid to abut against one end of the sliding portion 3D away from the pill outlet 3A, the pill outlet 3A is completely exposed. It is understood that since the second positioning protrusion 6B is slidable in the sliding portion 3D, when the pill dispenser is turned over to pour out the specific type of pills, a user needs to press the pushing cover to control an exposed area of the pill outlet 3A.

In one alternative embodiment, two positioning portions 3E are provided. The positioning portions comprise a first positioning portion and a second positioning portion. The first positioning portion and the second positioning portion are respectively located on two sides of the sliding portion 3D. The first positioning portion is disposed close to the pill outlet 3A. The second positioning portion is disposed away from the pill outlet 3A. When the pushing cover 6 is pushed to enable the second positioning protrusion 6B being clamped in the one positioning portion, the pushing cover 6 completely covers the pill outlet to close the pill outlet 3A. When the pushing cover 6 is pushed to enable the second positioning protrusion 6B to slide in the sliding portion 3D, the pill outlet 3A is partially exposed. When the pushing cover 6 is pushed to enable the second positioning protrusion 6B being clamped in the second positioning portion, the pill outlet 3A is completely exposed. In the embodiment, the two positioning portions 3E are symmetrically located at two sides of the sliding portion 3D. By providing the two positioning portions 3E, when the pill outlet 3A is completely exposed or completely closed, the pushing cover 6 is relatively fixed on the pill outlet cover 3. Therefore, when the pill outlet 3A is completely exposed, the user does not need to press on the pushing cover and only needs to directly turn over the pill dispenser to pour out the pills.

In one optional embodiment, sliding plates 3G are respectively protruded from inner sides the sliding grooves 3H. The sliding plates 3G are disposed opposite to each other. Siding bars 6C are disposed on a bottom portion of the pushing cover 6. The sliding bars 6C are parallel to each other and spaced apart from each other. The sliding bars 6C are respectively slidable on the sliding plates 3G.

Limited by any one of the two positioning portions 3E, the pushing cover 6 and the pill outlet cover 3 are relatively fixed to enable the pill outlet 3A being switched between completely exposed or completely closed. Therefore, as shown in FIG. 8, the second positioning protrusion 6B disposed on the pushing cover 6 is matched with the second positioning portion for positioning, so that the pushing cover 6 and the pill outlet cover 3 are relatively fixed, and the pill outlet 3A is completely exposed. When the pill dispenser is turned over, and the second positioning protrusion is clamped in the second positioning portion, so the pushing cover 6 do not slide down nor close the pill outlet 3A, making a process of dispensing the specific type of pills smooth. When the pushing cover 6 is forced, the second positioning protrusion 6B deforms, enabling the pushing cover to be separated from the second positioning portion and enabling second positioning protrusion 6B to enter the sliding portion 3D. Then the pushing cover 6 is continuous forced to make the second positioning portion 6B to slide in the sliding portion 3D. As shown in FIG. 9, when the pushing cover 6 is pushed to enable the second positioning protrusion being clamped in the first positioning portion, the pushing cover 6 seals the pill outlet 3A to prevent the pills from falling out and protect the pills against dust and moisture.

In addition, as shown in FIG. 10, when the second positioning protrusion 6B separates from any one of the two positioning portions 3E and enters the sliding portion 3D, the pill outlet is partially exposed. The pushing cover 6 slides to changes the exposed area of the pill outlet 3A to control an amount of the specific type of pills poured out. If the amount of specific type of pills poured out is small, the exposed area of the pill outlet 3A is reduced so that the specific type of pills is not poured out too much to increase a work of refilling. On the contrary, the exposed area is increased to pour more pills, so as to realize an adjustment of the amount of the specific type of pills poured out.

Furthermore, as shown in FIG. 6 a top surface of the pushing cover 6 is recessed to define a pressing groove 6D. The pressing groove 6D is configured for the user to put a finger thereon. When in use, the pushing cover 6 is moved and adjusted by pressing on the pressing groove 6D with the finger.

In addition, in another alternative embodiment of the pill dispenser, the elastic positioning rib is disposed on the inner side wall of the pill outlet cover, and the positioning grooves 3B are defined on the outer side wall of the pill dispensing cover 2 (not shown in the drawings), which are flexibly disposed according to actual needs Other structures of the pill dispenser are same as the structures mentioned above.

The above embodiments are only optional embodiments of the present disclosure and cannot be used to limit the protection scope of the present disclosure. Any non-substantial changes and substitutions made by those skilled in the art on the basis of the present disclosure should fall within the protection scope of the present disclosure.

What is claimed is:

1. A pill dispenser, comprising:

a dispenser body, a pill dispensing cover, and a pill outlet cover;

wherein the dispenser body is hollow; a fixed cylinder is disposed at a center of the dispenser body; partition plates are connected between an outer wall of the fixed cylinder and an inner wall of the dispenser body to define pill cavities; the partition plates are disposed in a circumferential array along the center of the dispenser body; at least one end of each of the partition plates extends out of the dispenser body; each of the pill cavities is defined between each two adjacent partition plates;

wherein clamping grooves are defined in an outer edge of a bottom portion of the pill dispensing cover; a periphery of each of the partition plates is clamped in a corresponding one of the clamping grooves; so the pill dispensing cover is fixed to the dispenser body; pill dispensing openings are defined on the pill dispensing cover; the pill dispensing openings are one-to-one corresponding to the pill cavities; when the pill dispensing cover is fixed to the dispenser body, an end surface of each of the partition plates abuts against a bottom surface of the pill dispensing cover;

wherein the pill outlet cover is rotatably connected to the pill dispensing cover; the pill outlet cover defines a pill outlet; the pill outlet cover rotates to enable the pill outlet to communicate with any one of the pill dispensing openings.

2. The pill dispenser according to claim 1, wherein a positioning column is protruded from a center of the bottom portion of the pill dispensing cover, and the positioning column is inserted into the fixed cylinder.

3. The pill dispenser according to claim 1, wherein an elastic positioning rib is disposed on an outer side wall of the pill dispensing cover; a first positioning protrusion is disposed on one end of the elastic positioning rib; the elastic positioning rib is forced to enable the first positioning protrusion to deform in a radial direction of the pill dispensing cover.

4. The pill dispenser according to claim 3, wherein positioning grooves are defined on an inner side wall of the pill outlet cover; the positioning grooves are disposed in a circumferential array; the first positioning protrusion is snapped in any one of the positioning grooves to enable the pill outlet to communicate with a corresponding pill dispensing opening.

5. The pill dispenser according to claim 1, wherein an elastic positioning rib is disposed on an inner wall of the pill outlet cover; a first positioning protrusion is disposed on one end of the elastic positioning rib; the elastic positioning rib is forced to enable the first positioning protrusion to deform in a radial direction of the pill outlet cover.

6. The pill dispenser according to claim 5, wherein positioning grooves are defined on an outer side wall of the pill dispensing cover; the positioning grooves are disposed in a circumferential array; the first positioning protrusion is snapped in any one of the positioning grooves to enable the pill outlet to communicate with a corresponding pill dispensing opening.

7. The pill dispenser according to claim 2, wherein plugging columns are protruded from a center of a bottom surface of the pill outlet cover; the plugging columns are inserted into the positioning column and are fastened to the positioning column.

8. The pill dispenser according to claim 1, wherein the pill dispenser further comprises a pushing cover movably disposed on the pill outlet cover; the pushing cover is pushed to expose or close the pill outlet.

9. The pill dispenser according to claim 8, wherein the pill outlet cover comprises a fixed groove; the pill outlet is defined on a bottom wall of the fixed groove; the pill outlet is located on one end of the fixed groove; sliding grooves are defined on the inner side of the fixed groove; the sliding grooves are disposed opposite to each other; blocks are protruded from an outer side of the pushing cover; the blocks are one-to-one matched with the sliding grooves; the blocks are slidable along the sliding grooves to expose or close the pill outlet.

10. The pill dispenser according to claim 9, wherein a sliding portion and at least one positioning portion are defined on the fixed groove; a second positioning protrusion is disposed on a bottom portion of the pushing cover; the second positioning protrusion is disposed on one end of the pushing cover away from the pill outlet; the sliding portion and the at least one positioning portion are disposed opposite to the pill outlet; a center of the pill outlet, a center of the sliding portion, a center of the at least one positioning portion, and a center of the pill outlet cover are on a same straight line; when the pushing cover is pushed, the second positioning protrusion is slid in the sliding portion or is slid to be clamped in the at least one positioning portion.

11. The pill dispenser according to claim 10, wherein only one positioning portion is provided; the one positioning portion is located on one side of the sliding portion close to the pill outlet; when the pushing cover is pushed to enable the second positioning protrusion being clamped in the one positioning portion, the pushing cover completely covers the pill outlet to close the pill outlet; when the pushing cover is pushed to enable the second positioning protrusion to slide in the sliding portion, the pill outlet is partially exposed or completely exposed.

12. The pill dispenser according to claim 10, wherein two positioning portions are provided; the positioning portions comprise a first positioning portion and a second positioning portion; the first positioning portion and the second positioning portion are respectively located on two sides of the sliding portion; the first positioning portion is disposed close to the pill outlet; the second positioning portion is disposed away from the pill outlet; when the pushing cover is pushed to enable the second positioning protrusion being clamped in the one positioning portion, the pushing cover completely covers the pill outlet to close the pill outlet; when the pushing cover is pushed to enable the second positioning protrusion to slide in the sliding portion, the pill outlet is partially exposed; when the pushing cover is pushed to enable the second positioning protrusion being clamped in the second positioning portion, the pill outlet is completely exposed.

13. The pill dispenser according to claim 9, wherein sliding plates are respectively protruded from inner sides the sliding grooves; the sliding plates are disposed opposite to each other; sliding bars are disposed on a bottom portion of the pushing cover; the sliding bars are parallel to each other and spaced apart from each other; the sliding bars are respectively slidable on the sliding plates.

14. The pill dispenser according to claim 1, wherein the pill dispenser further comprises an upper cover and a bottom cover; the bottom cover covers on a lower end of the dispenser body; the upper cover covers on the pill outer cover and is rotatably connected to an upper end of the dispenser body.

* * * * *